July 20, 1965 W. HERBST ETAL 3,196,039
PROCESS AND SOLUTION FOR THE AFTER-TREATMENT
OF PHOSPHATE COATINGS
Original Filed April 13, 1961
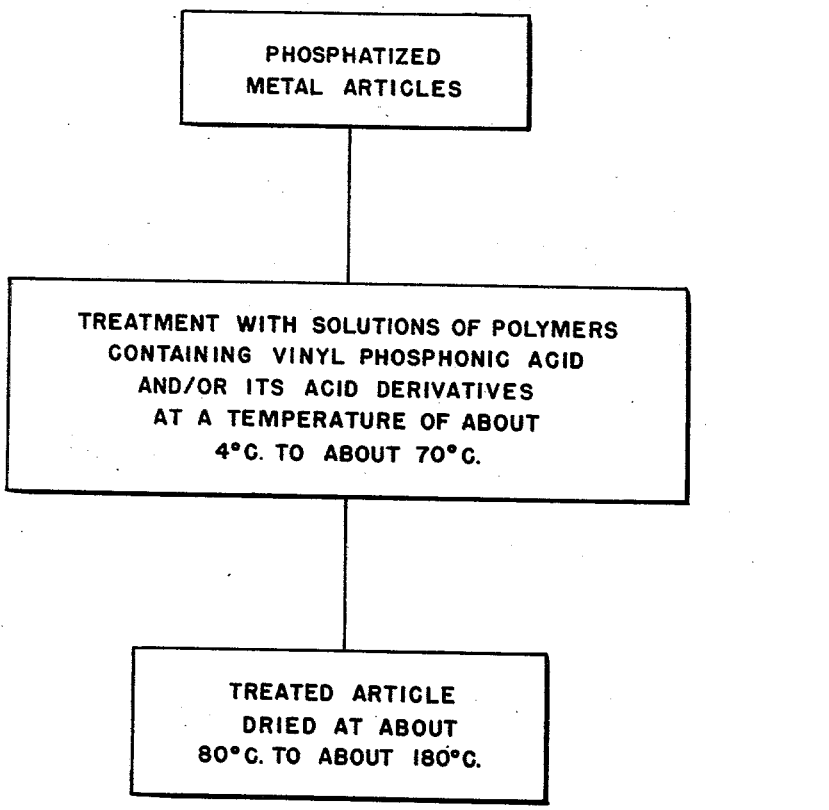
INVENTORS
Willy Herbst
Ernst Wagner
BY
Curtis, Morris + Safford
ATTORNEYS

United States Patent Office 3,196,039
Patented July 20, 1965

3,196,039
PROCESS AND SOLUTION FOR THE AFTER-TREATMENT OF PHOSPHATE COATINGS
Willy Herbst, Hofheim, Taunus, and Ernst Wagner, Frankfurt am Main, Germany, assignors to Farbwerke Hoechst Aktiengesellschaft vormals Meister Lucius & Brüning, Frankfurt am Main, Germany, a corporation of Germany
Continuation of application Ser. No. 102,653, Apr. 13, 1961. This application July 7, 1964, Ser. No. 381,614
Claims priority, application Germany, Apr. 16, 1960, F 31,023
5 Claims. (Cl. 117—75)

The present application is a continuation of our co-pending application Serial No. 102,653, filed April 13, 1961, now abandoned.

The present invention provides a process for the after-treatment of phosphatized metal surfaces in order to improve the corrosion protection and an aqueous and/or alcoholic solution for that process, said solution containing at least one polymer or copolymer of vinyl phosphonic acid and/or acid derivatives thereof.

The phosphatizing processes that have been used for decades for the purpose of inhibiting the corrosion of iron and steel surfaces result in phosphate coatings by means of which, on account of their porosity, there is only attained an insufficient protection of the metal in many cases. In order to attain an effective corrosion protection, the phosphatizing process is, therefore, often followed by a rinsing with dilute aqueous chromic acid. The amounts of chromic acid penetrating into the pores of the phosphate coating during this rinsing procedure improve the protective value of these coatings.

This after-treatment, however, involves the inconvenience of a special treatment of the waste water. On account of the considerable toxicity of the compounds of chromium-VI and chromium-III, these compounds must be removed almost quantitatively from the waste water which entails considerable expense. The chromic acid concentrates used for preparing and replenishing the baths can, moreover, be manipulated with difficulty only on account of their strongly corrosive properties.

Now we have found a process for the after-treatment of phosphatized metal surfaces in order to improve the corrosion protection in which the disadvantage of the process described above is avoided and which consists in treating the phosphatized metal parts with a solution containing polyvinyl phosphonic acid and/or copolymers of vinyl phosphonic acid and/or the acid derivatives thereof which contain, per monomer unit, only one free hydroxyl group at the phosphorus atom, advantageously the semi-esters of vinyl phosphonic acid, and the metal parts thus treated are subsequently dried.

The accompanying drawing shows a simplified flow diagram of the invention as described above.

As suitable components for the copolymers of vinyl phosphonic acid and/or the copolymers of the acid derivatives of vinyl phosphonic acid which contain only one free hydroxyl group per monomer unit at the phosphorus atom, advantageously the semi-esters of vinyl phosphonic acid, there may be used mono- or polyunsaturated organic compounds having a substantially polar character, for example acrylic acid, methacrylic acid, and the esters of aliphatic alcohols thereof containing 1 to 5 carbon atoms, the amides and nitriles thereof, also vinyl esters such, for example, as vinyl acetate and vinyl propionate, maleic acid anhydride and crotonic acid.

There may also be used copolymers of vinyl phosphonic acid that are built up from at least three components, for example, from vinyl phosphonic acid, acrylic acid and maleic anhydride or crotonic acid.

It has been found that solutions containing only about 0.0001% by weight of polymer bring about a noticeable improvement in the protection against corrosion as compared with phosphatized metal parts that have not been treated according to the invention.

However, especially those solutions have proved to be useful that contain about 0.008 to about 2% by weight, preferably 0.02 to 0.5% by weight, of polymer.

As solvents for the polyvinyl phosphonic acid and the copolymers cited there may, in addition to water, also be used aliphatic alcohols containing 1 to 4 carbon atoms in the molecule, preferably isopropanol, or mixtures of water and the said aliphatic alcohols.

According to the invention it has also been found to be advantageous to use a solution which contains a wetting agent in addition to the copolymer. As such wetting agents, commercially available products in the usual concentrations may be used when water or a mixture of water and organic solvents in which the predominant part is water are used. Non-ionogenic wetting agents, of example those on the basis of ethylene oxide, have proved to be useful.

The process according to the invention is advantageously carried out such that the phosphatized metal parts are treated with the after-treatment solutions described above for a short time ranging from a few seconds to several minutes, for example, one second to 2 minutes, at a temperature of about 4° C. to about 70° C., preferably about 10° C. to about 25° C., and subsequently dried at about 80° C. to about 180° C., preferably 120° C. to 150° C. The drying depends primarily on the solvent or the solvent mixture used. The phosphatized metal parts can be treated in the usual manner, for example by spraying, immersion or flooding.

The present invention is also directed to the solutions used for carrying out the process, said solutions containing about 0.008 to about 2% by weight of polyvinyl phosphonic acid and/or copolymers of vinyl phosphonic acid and/or the acid derivatives thereof which contain only one free hydroxyl group at the phosphorus atom, advantageously the semi-esters of vinyl phosphonic acid dissolved in water and/or alcohols containing 1 to 4 carbon atoms and, if desired, commercial wetting agents. Other components of the dissolved copolymer may be organic compounds containing one or more olefinic bonds, especially acrylic acid, methacrylic acid and the esters of aliphatic alcohols thereof containing 1 to 5 carbon atoms, amides and nitriles as well as vinyl esters, maleic acid anhydride and crotonic acid.

The following examples serve to illustrate the invention but they are not intended to limit it thereto:

EXAMPLE 1

Steel plates (of class St VIII as characterized by Deutsche Industrie Norm (DIN 1623) coated with a well adhering, light-gray layer of zinc phosphate according to known phosphatizing processes, were, after an intermediate rinsing with cold water, immersed for 20 seconds in a solution containing 0.4 g./l. of a copolymer of vinyl phosphonic acid and acrylic acid (molar ratio 80:20) and dried in the drying closet at 150° C. for 5 minutes. For the purpose of comparison, some of the phosphatized steel plates were immersed, instead of in the aforesaid polymer solution, for 30 seconds in a commercially available after-treatment solution, containing 0.21 g./l. of chromic acid and small quantities of an alkali metal phosphate and having a pH value of 4, and likewise dried in the drying closet at 150° C. for 5 minutes.

The steel plates after-treated according to the two different processes were then coated with an alkyd resin baking varnish in two stages (primer and enamel) at a baking temperature of 145° C., the baking time amounting to 25 minutes in each case, and subjected to the various usual corrosion tests.

It was found that the test samples, both those after-treated according to the invention and those after-treated with a solution of chromic acid, have excellent test values. Phosphatized steel plates that have not been after-treated, however, only possess an inferior protection against corrosion; their test values are poor.

EXAMPLE 2

Steel plates (of class St VIII) coated according to known phosphatizing processes with a well adhering layer of zinc phosphate having a thickness of about 2μ were, after an intermediate rinsing with cold water, immersed for 30 seconds in an aqueous solution containing 0.4 g./l. of polyvinyl phosphonic acid and then dried in the drying closet at 150° C.

In addition to the aforesaid tests, a further number of said steel plates coated with a layer of zinc phosphate were treated with various other solutions the compositions of which are shown in the following table. In this table are indicated in column 2 the concentrations of the respective polymers per liter of solution and the molar ratio for the copolymers, in column 3 the solvent, in column 4 the time of immersion, in column 5 the temperature of the after-treatment solutions and in column 6 the drying temperatures.

subjected to the usual corrosion tests. All steel plates exhibited a very good corrosion protection.

EXAMPLE 3

Steel plates of class St VIII coated with a well adhering finely crystalline dark layer of manganese phosphate according to the known phosphatizing processes were, after an intermediate rinsing with cold water, treated for 10 seconds with a solution which was composed as follows:

738 cc. of water
262 cc. of isopropanol
1.2 grams of polyvinyl phosphonic acid.

The test samples which were then dried in the drying closet at 125° C. for 7 minutes exhibited an excellent protection against corrosion.

What is claimed is:
1. A process for improving the corrosion protection of phosphatized metal surfaces, which process comprises after-treating said phosphatized metal surfaces at a temperature of about 4° C. to about 70° C. for a period of from one second to two minutes with a solution containing about 0.008 to about 2 percent by weight of at least one substance selected from the group consisting of (A) a homopolymer of vinyl phosphonic acid and (B) a copolymer of (1) at least one compound selected from the group consisting of (a) vinyl phosphonic acid and (b) the acid derivatives thereof which contain only one

*Table*

| Test | Concentration of polymer per liter/solution | Solvent | Time of immersion | Bath temperature ° C. | Drying temperature ° C. |
|---|---|---|---|---|---|
| a | 5 grams of polyvinyl phosphonic acid | Water | 5 sec | 18 | 120 |
| b [1] | 15 grams of polyvinyl phosphonic acid | do | 1.5 sec | 4 | 180 |
| c | 0.5 gram of a copolymer of vinyl phosphonic acid and acrylic acid (molar ratio 60:40) | do | 30 sec | 8 | 150 |
| d | 4 grams of a copolymer of vinyl phosphonic acid and acrylic acid (molar ratio 80:20) | do | 2 sec | 15 | 140 |
| e | 0.8 gram of a copolymer of vinyl phosphonic acid and methacrylic acid (molar ratio 50:50) | do | 1 sec | 70 | 140 |
| f | 1 gram of a copolymer of vinyl phosphonic acid and methacrylic acid methyl ester (molar ratio 78:22) | do | 5 sec | 30 | [2] 220 |
| g | 1.2 grams of a copolymer of vinyl phosphonic acid and acrylic acid methyl ester (molar ratio 80:20) | do | 20 sec | 16 | 160 |
| h | 0.6 gram of a copolymer of vinyl phosphonic acid and vinyl acetate (molar ratio 80:20) | do | 2 min | 6 | 150 |
| i | 2.1 grams of a copolymer of vinyl phosphonic acid and acrylic acid (molar ratio 80:20) | Isopropanol | 1 min | 20 | [3] |
| k | 1.1 grams of a copolymer of vinyl phosphonic acid and acrylic acid (molar ratio 80:20) | Ethanol | 1 min | 23 | 89 |
| l | 3.0 grams of a copolymer of vinyl phosphonic acid and acrylic acid (molar ratio 80:20) | Mixture of 900 cc. of water and 100 cc. of butanol. | 4 sec | 29 | 140 |
| m | 0.6 gram of a copolymer of vinyl phosphonic acid and acrylic acid (molar ratio 40:60) | Mixture of 500 cc. of water and 500 cc. of isopropanol. | 45 sec | 20 | 140 |
| n | 20.0 grams of a copolymer of vinyl phosphonic acid monoethyl ester and acrylic acid (molar ratio 72:28) | Water | 2 sec | 18 | 150 |
| o [1] | 0.09 gram of a copolymer of vinyl phosphonic acid monooctyl ester and vinyl acetate (molar ratio 81:19) | Mixture of 258 cc. of water and 742 cc. of isopropanol. | 30 sec | 18 | 130 |
| p | 0.4 gram of a copolymer of vinyl phosphonic acid and acrylic acid amide (molar ratio 83:17) | Mixture of 369 cc. of water and 631 cc. of isopropanol. | 10 sec | 18 | 140 |

[1] These solutions contain also a non-ionogenic wetting agent on the basis of ethylene oxide in a concentration of 1% (b) or 60% (o), calculated on the polymer concentration.
[2] Drying time 3 minutes.
[3] Hot-air blower.

After drying, all steel plates treated with the solutions enumerated in the table as given above were coated with an alkyd resin baking varnish in two stages (primer and enamel) at a baking temperature of 145° C., the baking time amounting to 25 minutes in each case, and free hydroxyl group per monomer unit at the phosphorus atom, and, as comonomer, (2) at least one compound selected from the group consisting of (a) acrylic acid, (b) methacrylic acid, (c) esters of acrylic acid and methacrylic acid with aliphatic alcohols containing one to five carbon atoms, (d) amides of acrylic acid and methacrylic acid, (e) vinyl acetate, (f) maleic acid anhydride, and (g) crotonic acid, and then drying the treated surfaces at a temperature between about 80° C. and about 180° C.

2. A process as in claim 1 wherein said solution contains, as a solvent, at least one member selected from the group consisting of water and aliphatic alcohols containing one to four carbon atoms.

3. A process as in claim 1 wherein said solution additionally contains a wetting agent.

4. An after-treating solution for improving the corrosion protection of phosphatized metal surfaces, which solution contains, as a solvent, at least one member selected from the group consisting of water and aliphatic alcohols containing one to four carbon atoms, and, as a solute, about 0.008 to about 2 percent by weight of at least one substance selected from the group consisting of (A) a homopolymer of vinyl phosphonic acid and (B) a copolymer of (1) at least one compound selected from the group consisting of (a) vinyl phosphonic acid and (b) the acid derivatives thereof which contain only one free hydroxyl group per monomer unit at the phosphorus atom, and, as comonomer, (2) at least one compound selected from the group consisting of (a) acrylic acid, (b) methacrylic acid, (c) esters of acrylic acid and methacrylic acid with aliphatic alcohols containing one to five carbon atoms, (d) amides of acrylic acid and methacrylic acid, (e) vinyl acetate, (f) maleic acid anhydride, and (g) crotonic acid.

5. A solution as in claim 4 which additionally contains a wetting agent.

No references cited.

RICHARD D. NEVIUS, *Primary Examiner.*